United States Patent [19]

Linke

[11] 3,812,536

[45] May 21, 1974

[54] MAGNETIC HEAD HAVING GUIDE SURFACES FOR THE MAGNETIC RECORDING MEDIUM MADE OF CERAMIC MATERIAL

[76] Inventor: Siegfried Linke, Wilhdm-Magr.-Strasse lc, 8 Munich, Germany

[22] Filed: Sept. 8, 1971

[21] Appl. No.: 178,708

[30] Foreign Application Priority Data

Sept. 11, 1970 Germany .......................... 2045073

[52] U.S. Cl. ................ 360/122, 360/118, 360/130

[51] Int. Cl. .......................... G11b 5/26, G11b 5/58

[58] Field of Search ............. 179/100.2 C, 100.2 D; 340/174.1 F; 346/74 MC

[56] References Cited

UNITED STATES PATENTS

| | | | |
|---|---|---|---|
| 3,394,362 | 7/1968 | Gooch | 179/100.2 D |
| 3,610,837 | 10/1971 | Brede | 179/100.2 C |
| 3,586,788 | 6/1971 | Page | 179/100.2 C |
| 2,793,253 | 5/1957 | Howey | 179/100.2 C |
| 3,521,006 | 7/1970 | Michael | 179/100.2 C |
| 3,299,218 | 1/1967 | Wagenhals | 179/100.2 C |
| 2,912,516 | 11/1959 | Hallmann | 179/100.2 C |
| 2,911,481 | 3/1959 | Augustin | 179/100.2 C |

*Primary Examiner*—Bernard Konick
*Assistant Examiner*—Jay P. Lucas
*Attorney, Agent, or Firm*—Fleit, Gipple & Jacobson

[57] ABSTRACT

A magnetic head for cassette tape recorders or for other recording devices, wherein those parts which form a bearing surface for the tape and which hold the magnet system at the gap consist of a ceramic material formed so as to guide both edges of the tape correctly across the transducing zone. The bearing surface comprises a ceramic base plate and ceramic guide plates.

5 Claims, 15 Drawing Figures

Figure 1:
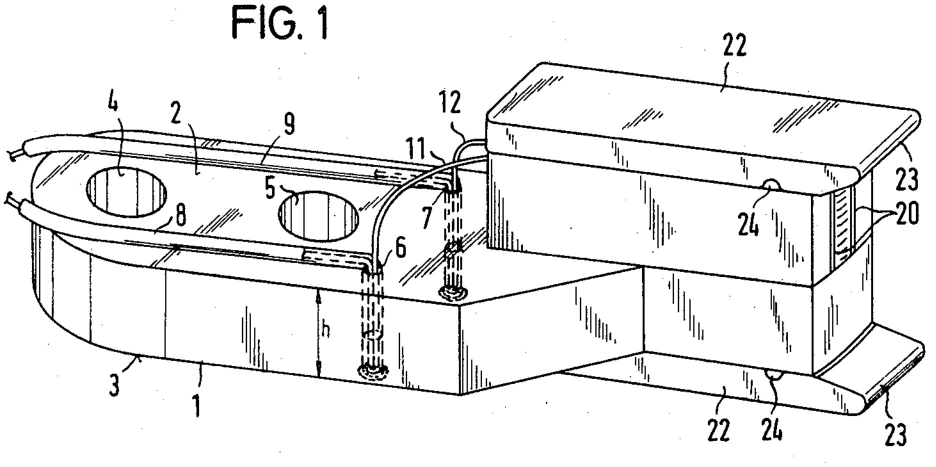

INVENTOR:

Siegfried Linke

BY:

Fleit, Gipple & Jacobson

Attorneys

MAGNETIC HEAD HAVING GUIDE SURFACES FOR THE MAGNETIC RECORDING MEDIUM MADE OF CERAMIC MATERIAL

The invention relates to a magnetic head for cassette tape recorders or for other recording and reproducing devices, in particular to an erase head.

Magnetic heads, particularly erase heads for tape recorders or for other recording and reproducing devices, e.g. data processing machines, are known wherein depending on the number of tracks or track combinations on the tape to be erased a corresponding number of ferrite magnet systems is embedded in a magnetically non-conducting material. On the one hand such magnetic heads are designed to be suitable for mass production so that they can be manufactured at favourable prices; on the other hand, the requirements in respect of the exactness and accuracy of size of such magnetic heads have risen constantly. The width of a tape for cassette tape recorders amounts to 3.81 mm. This width has to accommodate at least two tracks and even four tracks in stereo tape recorders with bidirectional operation. The height of the ferrite magnet system and accordingly the height of the erase gap amounts to roughly 1.9 mm, allowance having to be made for the fact that two tracks are always erased simultaneously in the case of stereo operation. If one track is used as a control track, e.g. for showing slides, programmed instruction, etc., the gap height for the erasing system allocated to this track must be smaller than 1.9 mm because this track has to be erased alone. However, the magnet coil to be accommodated in this space must have roughly 90 turns in the case of erase heads. Since on the one hand the erasing action has to be prevented at all events from overlapping from one tape half to the other and since on the other hand there must be no residual recordings, tolerances between ± 0.01 and 0.05 mm are required of the components. Similar tolerances are required of data processing devices because the width of an individual track there is not greater than in the named cassette tape recorders. Nevertheless, provision must be made that only one quite specific track is recorded or erased whereas the other tracks may be changed only when this is required.

It is now known to accommodate ferrite systems in housings consisting of magnetically non-conducting metals, e.g. brass. However, the costs for the precision-machining of such housings are very high. Recently, a method has been adopted of casting the ferrite systems fixed in position by corresponding clamping devices in housings of plastics. However, the known plastics all have one or several of the disadvantages named below.

Most plastics migrate in the course of time, i.e. they are subject to changes in shape. There is generally no guarantee for accuracy of size in the μm range over long periods of time. Further, plastics have a different abrasion characteristic to ferrite owing to the action of the moving tape. Since the contact surface for the tape consists on the one hand of the ferrite legs forming the gap and on the other hand of the plastics, this means that the tape has a greater abrasive effect on the plastic surface than on the ferrite legs. The latter thus project and can damage the tape. Further, the tape moves up and down or lifts off, which means that the one or the other track will not be erased completely. Other plastics which come into question exhibit the disadvantage that the tape is sucked onto the plastic surface, which leads to synchronising faults on the tape. The surface of the plastics should accordingly be somewhat rough so that this suction effect is eliminated. However, the roughness should still be maintained when the tape has already rubbed away part of the surface after a corresponding period of operation. Many problems also arise as a result of static charges in the plastics, e.g. clicks. A further disadvantage of plastics which come into question consists in the fact that the temperature characteristic exhibits excessive differences compared with the temperature characteristic of the ferrite. Since cassette tape recorders in particular are used in vehicles or in places exposed to the sun and thus reach temperatures up to 80° C, the differing temperature characteristics lead to the formation of hairline cracks which impair the accuracy of size far above the given tolerance range. Another disadvantage of known plastics consists in the fact that they are subject to bite owing to the action of adhesives. However, the use of adhesives for mounting the head cannot be avoided in many cases. Here, only those characteristics of plastics are mentioned which can or have to be put up with under certain circumstances. However, one of the main problems is to be seen in the fact that most plastics absorb water and swell. Other characteristics which would exclude plastics from the outset for the purpose being discussed here, such as insufficient strength, inadequate electrical characteristics or the like, are not mentioned in particular here.

The object of the invention is to propose a magnetic head of the type in question which is on the one hand suitable for mass production, yet is characterised on the other hand by an unexpectedly high degree of accuracy to size and does not exhibit the named disadvantages.

The magnetic head according to the present invention is characterised in that the components serving to guide the tape and/or support and cover the magnet system and/or fasten the head on the device and/or the components arranged between several magnet systems consist of a ceramic material.

It was surprising to find that ceramics can satisfy the requirements mentioned at the beginning and that it is possible to manufacture magnetic heads — even those with the given, very small dimensions — with ceramic components.

In accordance with a preferred embodiment there is a base platelet made of a ceramic material whose thickness corresponds to roughly half the tape width, thus amounting to 1.9 to 2 mm in cassette tape recorders, and onto whose front part a ferrite magnet system is glued and whose rear, somewhat larger part bears fastening means for fastening the magnetic head on a holder of the device and for connecting up the electric leads. One tape guide platelet made of ceramic material is glued to that surface of the base platelet facing away from the ferrite system and one is glued to the ferrite system. The base platelet possesses a recess in which a part of the coil of the ferrite magnet system comes to rest.

This special design allows all the decisive tolerances to be reduced to grinding processes which can be performed with great precision without difficulty and without high costs. In other words, it is thus primarily a matter of ensuring that the top surface and the bottom surface of the base platelet are fully parallel to each other and that the thickness of the base platelet possesses a tolerance of max. ± 0.05. As mentioned, this can be achieved however without substantial difficulties. The remaining dimensions of the base platelet are of no interest with respect to the characteristics of the head. The top and bottom surfaces of the ferrite system can be ground with the same accuracy. Here, the guide platelets which are glued on provide a mouth-shaped inlet for the tape. The surfaces of the tape guide platelets which are adjacent to the two edges of the tape are at a distance from each other which corresponds exactly to the width of the tape plus roughly 0.01 mm, that is 3.82 mm in cassette tape recorders. In known devices the erase heads do not have a lateral guide for the tape. In fact separate tape guide pins are provided which are adjusted with respect to their height in relation to the magnetic heads. Apart from the fact that subsequent adjustments frequently have to be made, such adjusting work can be eliminated completely with the erase head according to the present invention. The new type of inlet mouth allows the tape to be picked up exactly when the cassette is put in and when the heads are pressed onto the tape.

It is also preferred if the ferrite magnet system is a twin-gap system where a magnet coil is pushed onto a centre cross-piece and where the centre cross-piece is adjoined to two lateral cross-pieces which possess recesses for the magnet coil and whose front ends do not extend fully to the centre cross-piece and thus form the gaps. The distance between the two gaps should be as small as possible, e.g. smaller than 0.6 mm. The front face of the head should be rounded off so that the wrap-around action is good with great contact force in the range of the gaps. The wrap-around stabilises the running of the tape, the height of the tape thereby being guided exactly in conjunction with the guides for the edges of the tape. However, this is of decisive significance in cassette tape recorders, also with respect to the recording and reproduction quality of music. According to the invention the centre cross-piece is lower in the range of the magnet coil than the lateral cross-pieces. However, the bottom surface of this centre cross-piece is arranged in the same plane as the lateral cross-pieces and is attached to the base platelet, whereas the front end of said centre cross-piece is drawn up in the form of a nose to the full height of the lateral cross-pieces. The upper tape guide platelet lies on the upper surfaces of the lateral cross-pieces and on the nose of the centre cross-piece.

Figure 2:
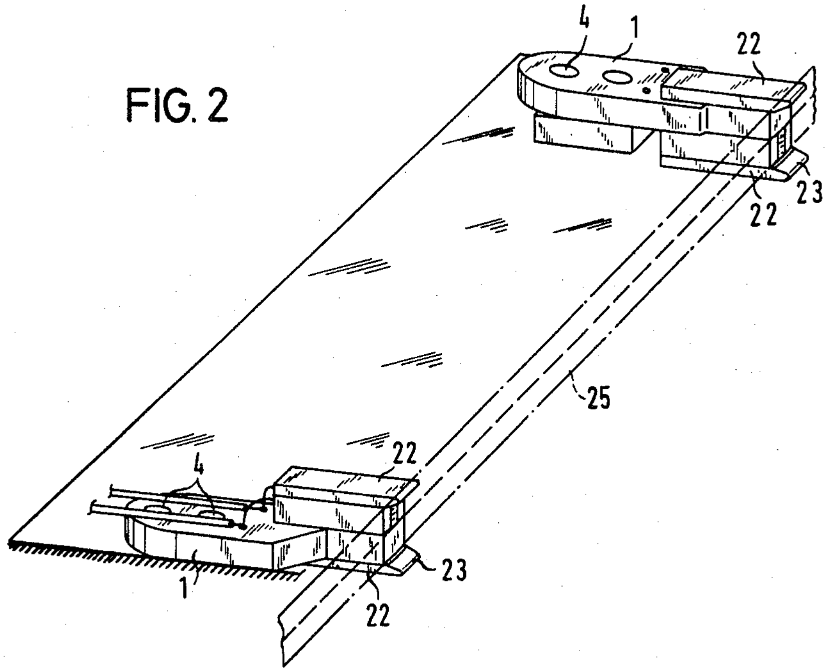
Figure 3:
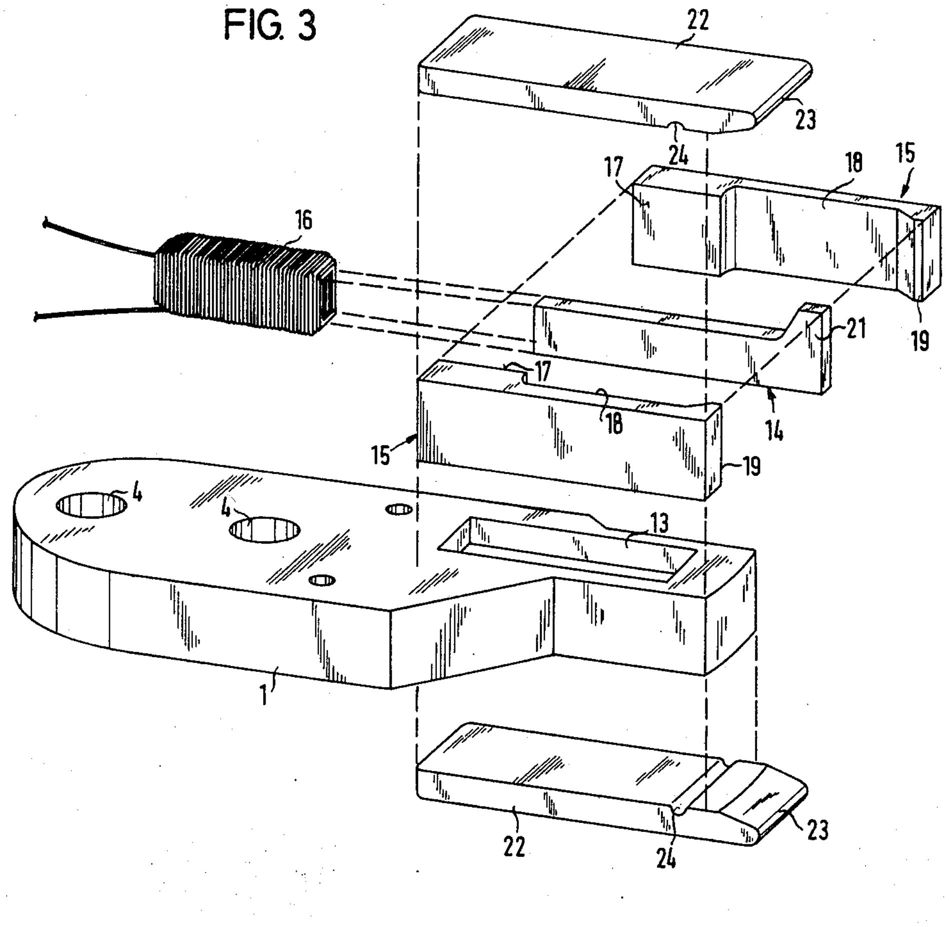
Figure 4:
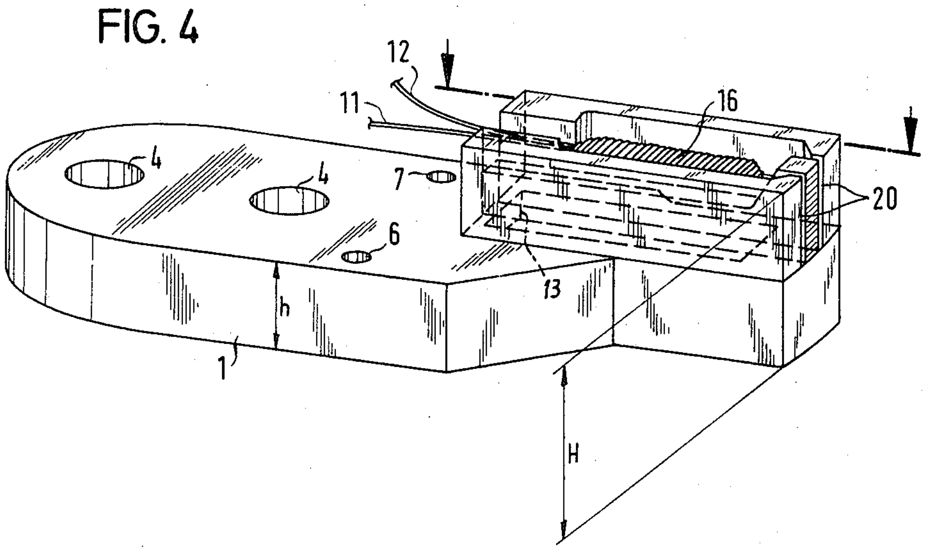

For two-track devices it is necessary to have either two separate erase heads or so-called two-level erase heads so that each track can be erased separately from the other before a new recording. A special advantage of the subject matter of the invention consists in the fact that the erase head for both the upper and lower tape halves or a two-level erase head can be manufactured with the same components. These advantages and others are to be found in the following description in conjunction with the accompanying drawings which show:

FIG. 1 a diagrammatic view of an erase head according to the invention on a much larger scale;

FIG. 2 a diagrammatic representation of the arrangement of two erase heads according to FIG. 1, switched over for track 1 and track 2;

FIG. 3 an exploded view of the erase head according to FIG. 1 on a larger scale;

FIG. 4 a diagrammatic representation and

Figure 5:
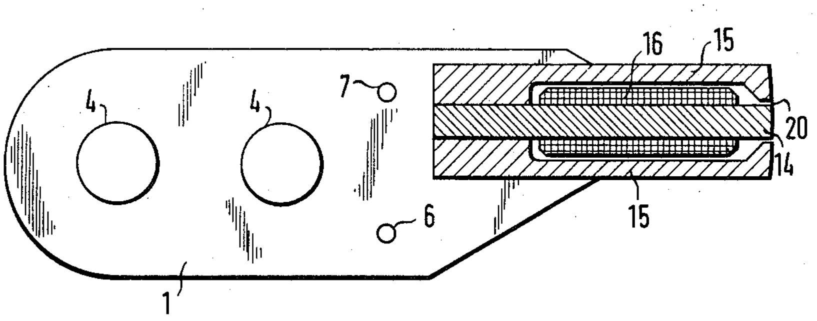
Figure 6:
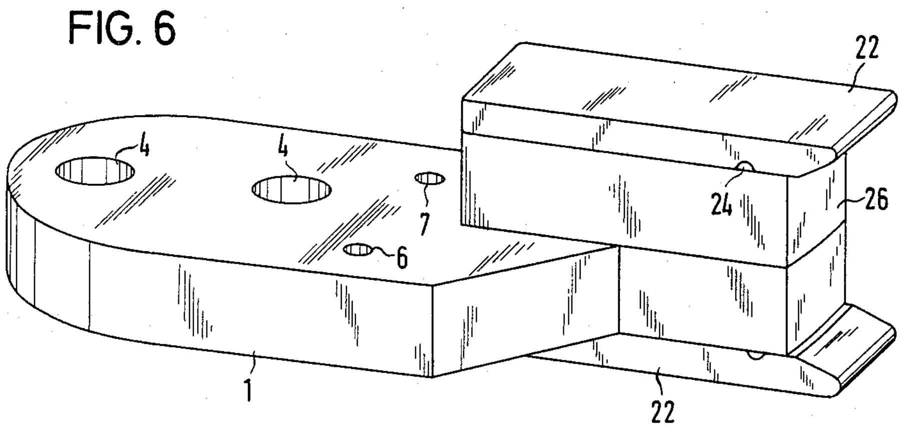
Figure 7:
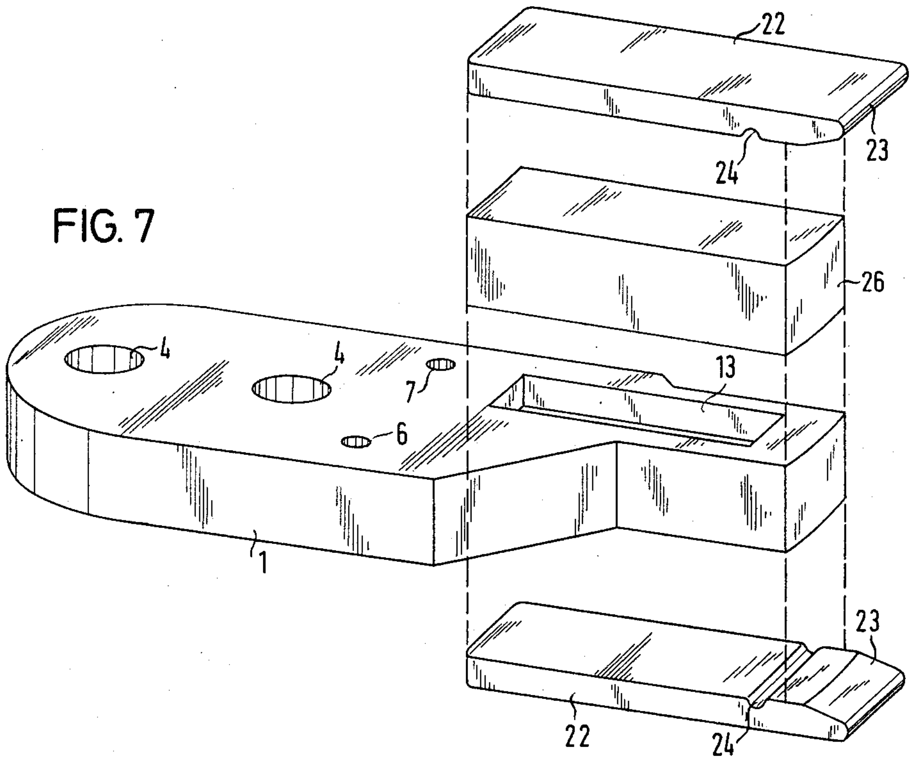
Figure 8:
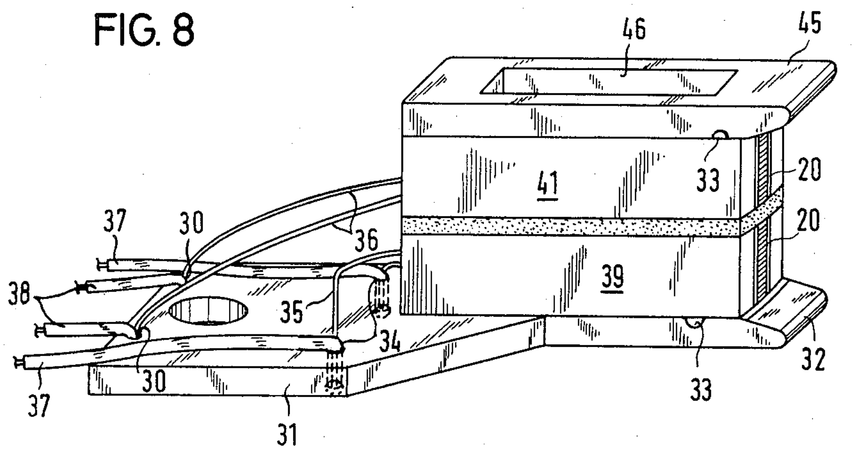
Figure 9:
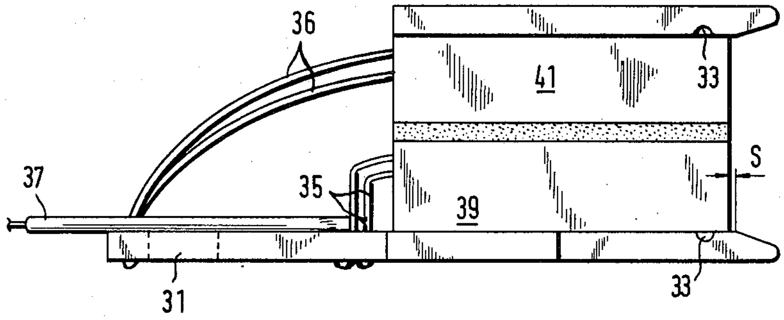
Figure 10:
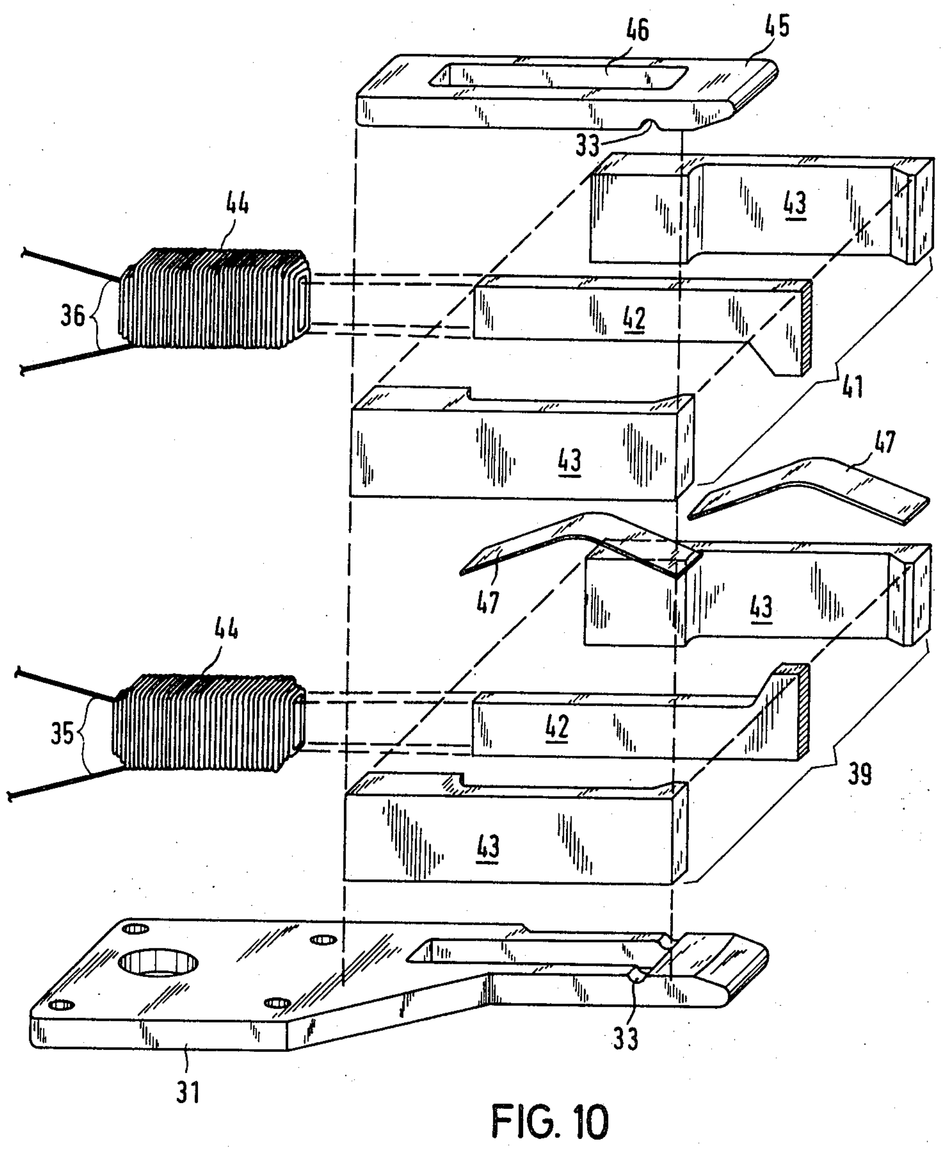
Figure 11:
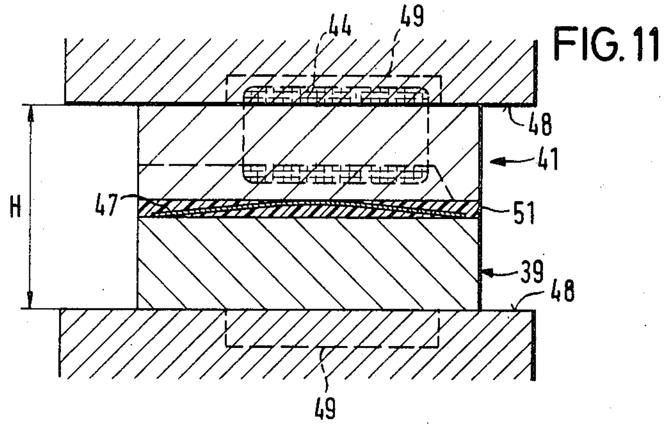
Figure 12:
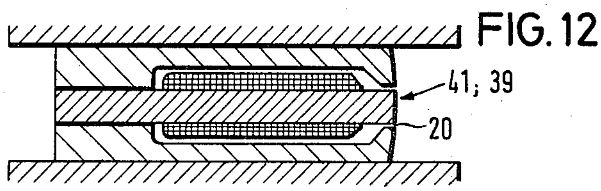
Figure 13:
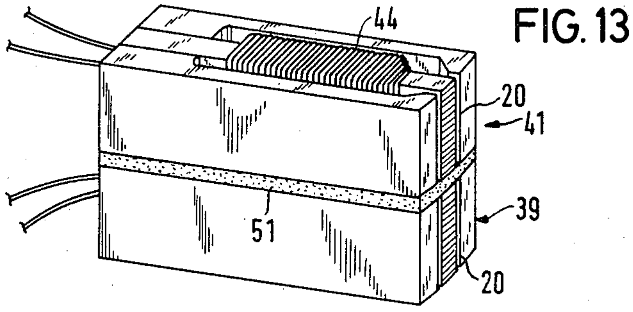
Figure 14:
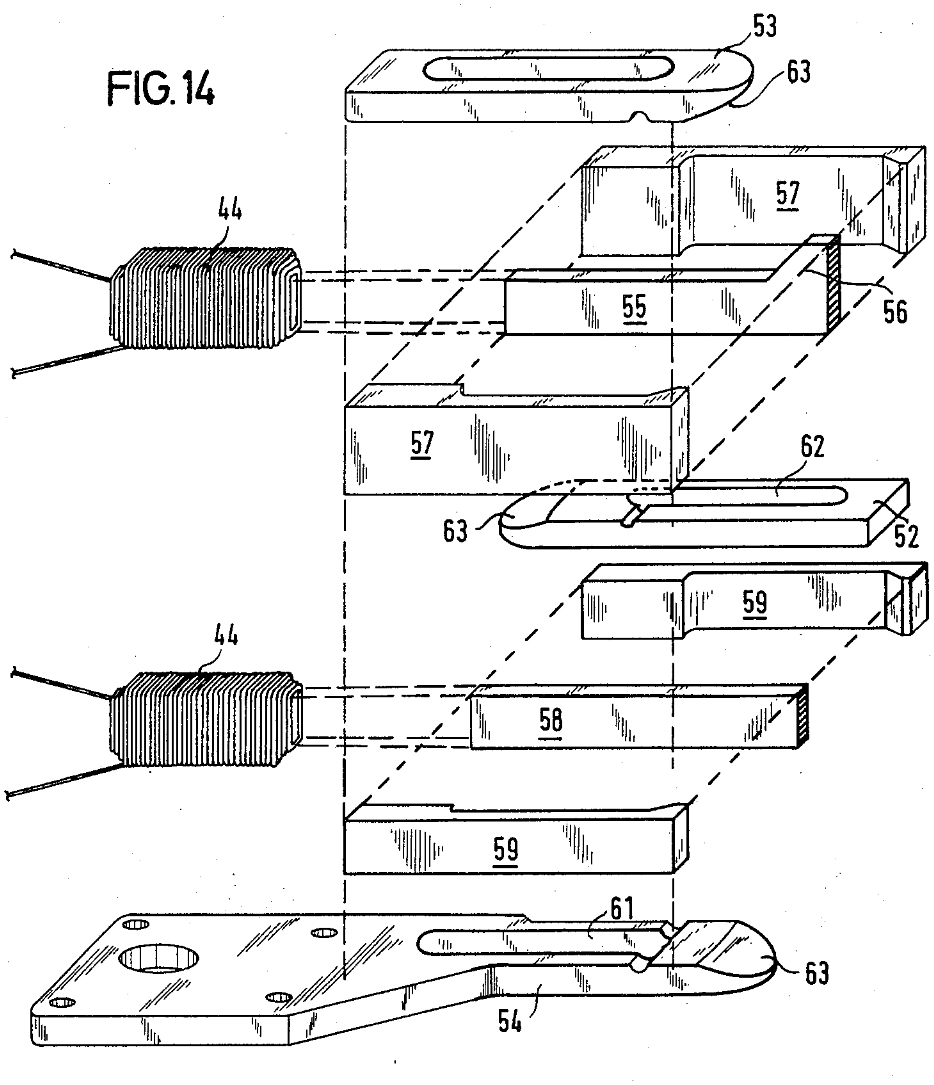
Figure 15:
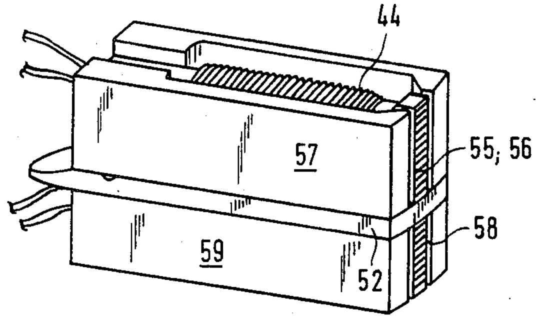

FIG. 5 a top view of the erase head according to FIG. 1 during the manufacturing process;

FIG. 6 a diagrammatic view of a tape guide on a larger scale;

FIG. 7 an exploded representation of the tape guide according to FIG. 6;

FIG. 8 a diagrammatic view of a two-level twin-gap erase head on a larger scale;

FIG. 9 a side view of the erase head according to FIG. 8;

FIG. 10 an exploded representation of the erase head according to FIGS. 8 and 9;

FIG. 11–13 different representations for explaining the mounting of the erase head according to FIGS. 8 to 10;

FIG. 14 an exploded representation of a further embodiment of an erase head;

FIG. 15 an erase head according to FIG. 14 without the top and bottom ceramic platelets.

The erase heads and tape guides shown in the drawings consist in the main of the same or similar components which can be put together in a unit-part manner. This represents an essential advantage, thanks to which a reduction in price on the one hand and better precision despite the smallness of the components on the other are achieved.

An essential part of the system is formed by a base platelet 1 made of ceramic material, in particular Stealan, corresponding to the DIN directives 40 685 type 221. The top surface 2 and the bottom surface 3 of the platelet are flat and ground smoothly so that an exact height $h$ is obtained which corresponds in the main to half the tape width. The rear end of the platelet 1 is somewhat wider and possesses two holes 4 and 5 of greater diameter and two holes 6 and 7 of smaller diameter. All the holes 4 to 7 extend from the top surface 2 down as far as the bottom surface 3. The holes 4 and 5 serve to fasten the magnetic head on a holder of the tape recorder. The ends of the lead cables 8 and 9 and the connecting ends 11 and 12 for the magnet coil of the system are inserted in the holes 6 and 7. The through ends 8 and 11 and 9 and 12 are drawn out beyond the bottom surface 3 and soldered together. Here, the solder bead should be so large that the wires can no longer be drawn back through the holes 6 and 7. Owing to this design one of the difficulties is eliminated which have so far opposed the use of ceramics for the given purpose, namely insufficient solderability. If the ceramic material were stoved with silver for this purpose, only very limited adhesion would be obtained with this type of ceramics, not to mention the question of the cost.

The front end of the ceramic platelet 1 is made narrower. As shown in FIG. 3, it possesses a recess 13 extending in the longitudinal direction.

The ferrite magnet system of the erase head is formed by a centre cross-piece 14, two lateral cross-pieces 15 and a magnet coil 16 which is pushed onto the centre cross-piece 14. The magnet coil 16 has roughly 90 turns. It consists of a copper wire which is coated with lacquer insulation and then a thermoplastics. After winding on a winding mandrel, hot air is blown at the coil so that the thermoplastics is baked. After cooling down, the coil correspondingly has a solid structure. In the case of erase heads for cassette tape recorders the inner diameter of the magnet coil amounts to roughly 0.8 mm and the outer diameter 1.9 mm.

The side legs 15 possess at the rear end wide contact surfaces 17, each leg having one recess 18 to house the magnet coil 16, and wedge-shaped front ends 19. If the side legs 15 are applied to the centre cross-piece 14, the front ends 19 do not reach quite as far as the centre cross-piece so that a gap 20 is accordingly formed to the left and to the right of the front edge of the centre cross-piece. A major part of the length of the centre cross-piece 14 is lower than the side legs 15. Its front end 21 alone is drawn up in the form of a nose up to the height of the side legs 15. The magnet coil 16 which is pushed onto the centre cross-piece 14 is accordingly situated on one side in the recess 13 of the base platelet 1, in the recesses 18 of the side legs 15 and in the lower back of the centre cross-piece 14. The centre cross-piece 14 and the lateral cross-pieces 15 are preferably made of ferrite.

The end is formed by two tape guide platelets 22 which likewise consist of a ceramic material, namely preferably of the above-mentioned material Stealan corresponding to DIN 40 685 type 221. The front end 23 of the tape guide platelets 22 is inclined in a wedge-shaped manner. At a certain distance from the wedge face 23 there is a groove 24 which serves to take up excessive adhesive.

FIG. 2 shows that two erase heads of the described type can be arranged at a considerable distance from each other and that the exact alignment of the tape can nevertheless be achieved, i.e. the centre line of the tape is aligned with an accuracy of 0.05 mm to the centre lines between the two magnet systems without adjustment. Since the surfaces of the mounting bridge on which the erase heads are fastened are plane to the given accuracy and since the ceramic base platelets 1 are likewise ground smooth to this accuracy, there is no need for time-wasting adjusting work, e.g. by turning additionally provided height guide pins.

The mounting of the erase head is shown in FIGS. 4 and 5.

The base platelet 1 which is ground to an exact height h is clamped in a clamping device which is not shown. The ferrite system is then put on, the magnet coil 16 coming to rest inthe recess 13 in the base platelet 1. A drop of an adhesive or filling compound is now dropped onto the coil 16. Owing to the surface roughness and surface porousness of the base platelet 1 consisting of a ceramic material the adhesive migrates into the bearing surface of the ferrite system on the base plate let as a result of the capillary effect. The ferrite system is joined insolubly tp the base platelet after a certain drying time. The cavities and the gaps 20 are filled up. Since the magnet coil 16 is somewhat lower than the surface of the ferrite system, the unit manufactured in this manner can now be ground to the degree H with an accuracy of at least one-hundred mm. The front side of the magnetic head which is designed to rest on a tape 25 is rounded off slightly by grinding in a further grinding process. The tape guide pieces 22 which are provided with adhesive are applied on one side to the ferrite system and on the other to the underside of the base platelet 1. The arrangement is clamped in place accordingly. The adhesive is distributed across the allocated surfaces as a result of the clamping pressure and the surface roughness of the ceramic material. Excessive adhesive is picked up by the adhesive catching groove 24 so that it cannot reach forwards as far as the tape contact surface.

FIGS. 6 and 7 show that tape guides can be manufactured in the same way. In this case, the ferrite system is replaced by a correspondingly shaped and ground ceramic part 26. This design of tape guides affords the great advantage that they have the same characteristics as the erase and magnetic heads, i.e. do not show a different type of wear to the latter. Particularly in the case of cassette tape recorders such guides will ensure that the tape is applied perfectly correctly when the cassette is pushed in.

A two-level twin-gap erase head is shown in FIGS. 8 to 13. A base plate 31 is again provided which has a similar design to the base plate 1 in the embodiment described above. However, the base plate 31 is by no means as thick as the base plate named above. The front end 32 of the base platelet 31 is longer and inclined in a wedge-shaped manner so that it can assume the task of guiding the tape. There is also an adhesive catching groove 33. In the rear wider part there are two pairs of holes 30 and 34 into which the connecting ends 35 and 36 of two ferrite magnet systems and the associated leads 37 and 38 are pushed through to the opposite side where they are soldered together. The allocated ferrite systems 39 and 41 are somewhat lower than would correspond to half the tape width. Otherwise, they are designed in a similar manner to that described above, i.e. each system possesses a centre cross-piece 42 (cf. FIG. 10) and two lateral cross-pieces 43 as well as a magnet coil 44. However, it must be pointed out that the raised nose of the centre cross-piece 42 of the lower ferrite system points upwards and that of the upper ferrite system downwards. Further, there is an upper tape guide platelet 45 which likewise consists of a ceramic material. The tape guide platelet 45 has a recess 46.

The system is mounted by means of an artifice, namely by inserting leaf springs 47 between the two ferrite magnet systems. The arrangement is clamped in place between two guide faces 48 which exhibit the appropriate distance and which possess recesses 49 for housing the magnet coil 44. The leaf springs 47 force the two ferrite systems apart and against the guide faces 49. An adhesive or filling compound is put in which ensures that the parts will be joined together accordingly and which fills the space 51 between the two ferrite magnet systems. The top surface and the bottom surface of the unit (FIG. 13) manufactured in this manner are now at an exact distance H from each other — 3.82 mm in the case of cassette tape recorders. The unit is now glued onto the base plate 31. The tape guide platelet 45 is also glued on.

It should also be mentioned that a small area S roughly 0.2 mm is width which is plane and not wedge-shaped remains between the wedge-shaped inlet mouth and the tape contact surface of the magnetic head. The edges of the tape are guided within this area S.

In the case of the embodiment shown in FIGS. 14 and 15 the gap height of the lower magnet system is slightly smaller than that of the upper magnet system. The slightly smaller gap height is above all alse sufficient for those applications where the lower half of the tape is used only in a one-track manner for control purposes, e.g. for controlling slides, for taking up inserts and corrections for dictations, for learning foreign languages, the upper tape half containing a stereo recording of the language lesson in the latter case, whereas the lower tape half is used to record what the student says or contains points of grammar in a mono recording.

In the embodiment shown there is a ceramic platelet 52 between the two magnet systems, a platelet 52 which is identical to a ceramic platelet 53 which forms the upper termination of the magnetic head. The lower termination of the magnetic head is formed by the ceramic platelet 54 designed in the form of a base platelet. In contrast to FIG. 13, it is not the filling compound filling the space 51 which forms the contact surface for the magnetic tape in the centre of the magnetic head, but the rear surface of the turned-around ceramic platelet 52, which means that the advantages named at the beginning are even more defined. The upper magnet system consists of a magnet coil 44, a centre cross-piece 55 which has a nose 56 which — in contrast to the embodiment shown in FIG. in the — is arranged in the upward direction, i.e. away from the centre, and also consists of lateral cross-pieces 57 which correspond to the lateral cross-pieces 43 in the embodiment according to FIG. 10. platelet as one one-hundredth The lower magnet system consists of a magnet coil 44, a centre cross-piece 58, which does not have a nose, and lateral cross-pieces 59, the height of which is however less than that of the lateral cross-pieces 57.

The magnet coil 44 of the lower magnet system comes to rest partly in a recess 61 in the ceramic platelet 54 and partly in a recess 62 in the ceramic platelet 52. The magnet coil 44 of the upper magnet system is likewise partly in the recess 62. However, it does not project beyond the nose 56 of the allocated centre cross-piece 55. This allows the magnetic head to be ground smooth to the exact degree before the ceramic platelet 53 is put on, without the upper magnet coil 44 being damaged. The magnetic head retains an excellent accuracy to size to long periods of time.

In contrast to the embodiments described before, the projecting and inclined ends 63 of the ceramic platelets 53, 54, ends which form the inlet mouth, are rounded off, which has proved advantageous. The end 63 of the centre ceramic platelet 52 projects to the rear beyond the rear side of the head.

Since the magnet systems are pressed onto exactly ground surfaces of components made of a ceramic material in the case of the erase heads according to the invention, an exactly accurate setting true to accuracy is also obtained without expensive adjusting work.

In conjunction with the advantages explained at the beginning which are afforded by ceramic contact surfaces for the tape, it is of special significance that apart from the ferrite parts no materials are used which damage the tape or whose shrinkage or swelling could impair the exact setting.

I claim:

1. A magnetic head for a recording and reproducing device, comprising a base platelet made of ceramic material and having a portion for fastening said magnetic head to said recording device, a center and two lateral cross-pieces attached to said base platelet at a point spaced from said fastening portion, said lateral cross-pieces having portions spaced from said center cross-piece to form gaps therebetween and adapted to contact a magnetic tape, one side of said gaps being adjacent said base platelet, a magnet coil operatively associated with said center crosspiece, said crosspieces being made of magnetically conductive material which will conduct the magnetic flux generated by said magnet coil through said gaps, an upper and a lower guide platelet made of ceramic material and having surfaces projecting out from said area of contact for guiding both sides of the magnetic tape, the upper guide platelet being positioned on the opposite side of said crosspieces from said base platelet, the lower guide platelet being positioned on the opposite side of said base platelet from said crosspieces, said base platelet forming the lower portion of the surface for guiding the magnetic tape between said guide platelets, said base platelet having a thickness which is roughly one-half of the height of the magnetic tape, said crosspieces forming the upper portion of said surface for guiding the magnetic tape, said magnet coil being positioned within said crosspieces such that its upper surface is below the surface of said crosspieces which is on the opposite side of said crosspieces from said base platelet.

2. The magnetic head of claim 1 in which said surfaces projecting out from said area of contact for guiding both sides of the magnetic tape include wedge-shaped portions.

3. The magnetic head of claim 1 in which said base platelet has a recess for receiving a portion of said magnet coil.

4. The magnetic head of claim 1 in which said lateral cross-pieces have recesses for receiving a portion of said magnet coil and wherein said magnet coil surrounds a portion of said center cross-piece.

5. The magnetic head of claim 4 in which said center cross-piece has a rear portion for receiving said magnet coil which is smaller in height than the adjacent portions of said lateral cross-pieces and has a front nose portion which has the same height as the adjacent portions of said lateral cross-pieces such that said upper guide platelet rests on the upper surfaces of said lateral cross-pieces and the nose portion of said center cross-piece.

* * * * *